UNITED STATES PATENT OFFICE.

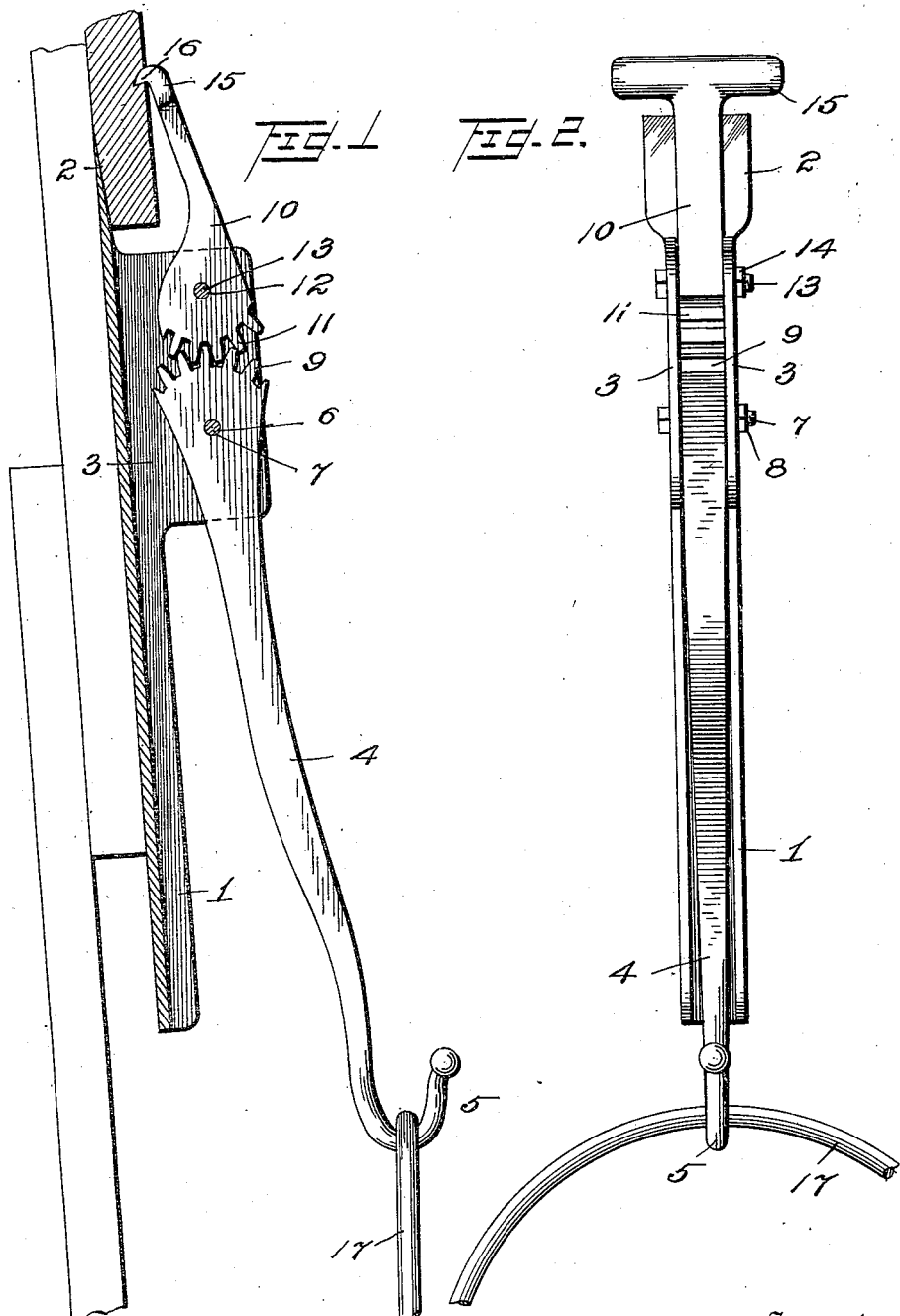

RUSSELL C. RYALS, OF DANIELS, WEST VIRGINIA.

PAINTER'S POTHOOK.

991,651.

Specification of Letters Patent.

Patented May 9, 1911.

Application filed February 15, 1911. Serial No. 608,854.

*To all whom it may concern:*

Be it known that I, RUSSELL C. RYALS, a citizen of the United States, residing at Daniels, in the county of Raleigh and State of West Virginia, have invented certain new and useful Improvements in Painters' Pothooks, of which the following is a specification.

The object of my invention is the provision of means comprising a hook designed to be detachably secured to a clapboard, weatherboard, sash, or other part of a building for supporting a painter's pot or pail where it shall easily be accessible for the workman while painting.

The invention consists in an implement having a base with one end brought to an edge or sharpened or made thin so it can be inserted between two clapboards or beneath the edge of a weatherboard or the like, and a double lever mechanism, one lever being provided with a hook and the other with a frictional surface or gripping edge or teeth.

The accompanying drawing illustrates an example of the physical embodiment of the invention constructed according to the best mode of procedure I have so far devised for the purpose.

Figure 1 is a longitudinal section of Fig. 2 in side elevation showing the intermeshing gear teeth of the levers and the way of applying the implement to a clapboard or weatherboard. Fig. 2 is a top plan view.

Referring to the figures, the numeral 1 designates the base which may be of forged or cast metal or struck up from sheet-metal to the required shape; 2, the thin or sharpened end of the base; 3, the perforated ears; 4, the hook lever; 5, the hook at the end of the lever for supporting the bail of a pot or pail; 6, a hole for a journal; 7, a bolt passed through the perforation in the lever and perforations in the ears; 8, a nut on the bolt; 9, teeth disposed in the arc of a circle; 10, the gripping lever; 11, teeth disposed of the arc of a circle; 12, a hole for a journal; 13, a bolt passed through the perforation in the gripping lever and perforations in the ears; 14, a nut on the bolt; 15, the head of the gripping lever; 16, teeth projecting from the head of the lever; and 17 designates the bail of a pot or pail supported by the hook lever.

The implement is adjustably secured to a clapboard (or weatherboard or sash or other projection) upon a building by inserting the edge or thin end of the base beneath the edge of the clapboard and then turning the hook lever about its pivot in the direction of the base forcing the teeth or frictional surface of the head of the gripping lever against the clapbord and causing it to frictionally press the edge of the board against the edge of the base. When thus adjusted the weight of the hook lever is sufficient to hold the implement in position and the added weight of the pot or pail by gravity tends to force the hook lever in the direction of the base and to cause the implement to grip the clapboard with greater force so that the greater the weight supported by the hook lever the more securely the device is held in its gripping position.

From the foregoing description taken with the drawing it is clear that I have produced an implement especially adapted for use by painters inasmuch as it can be adjusted within convenient reach of the painter and easily and quickly removed from one location to another. Moreover, its use will not deface or injure the building to which it is applied.

Obviously in the practical embodiment of the invention modifications can be introduced without constituting substantial departures.

What I claim as new and desire to secure by Letters Patent is:

1. An implement for painters' use comprising a base with one end provided with an edge adapted to be inserted beneath a weatherboard or the like, a lever having a hook at one end and gear teeth at the other end, a second lever having gear teeth at one end and gripping means at the other end, and journals by which the two levers are pivoted to the base so the gear teeth will intermesh.

2. An implement having a base with one end beveled to an edge and two perforated ears, and two levers pivoted to the ears the adjacent ends of the levers having intermeshing teeth, the free end of one lever being provided with gripping means and the free end of the other lever provided with a hook.

3. A painter's pot hook having a base with one end of flat thin metal, and two levers with intermeshing teeth pivoted to the base so the free ends of the levers will move in the same direction toward and away from the base, one of said levers having a hook and the other lever provided with a surface adapted to press an object against the thin edge of the base when the hook lever is turned about its pivot toward the base.

In testimony whereof I affix my signature in presence of two witnesses.

RUSSELL C. RYALS.

Witnesses:
 REBECCA L. SMITH,
 MARTHA PACK.

Copies of this patent may be obtained for five cents each, by addressing the "Commissioner of Patents, Washington, D. C."